(12) United States Patent
Hallstadius et al.

(10) Patent No.: US 8,359,732 B2
(45) Date of Patent: Jan. 29, 2013

(54) SPACER GRID FOR POSITIONING OF FUEL RODS

(75) Inventors: Lars Hallstadius, Västerås (SE); Mats Dahlbäck, Västerås (SE); John Bates, West Clearfield, UT (US); James Dougherty, Riverdale, UT (US); Steven J. King, Blythewood, SC (US); Robert J. Comstock, Irwin, PA (US)

(73) Assignee: Westinghouse Electric Sweden AB, Vasteras (SE)

( * ) Notice: Subject to any disclaimer, the term of this patent is extended or adjusted under 35 U.S.C. 154(b) by 1385 days.

(21) Appl. No.: 12/007,766

(22) Filed: Jan. 15, 2008

(65) Prior Publication Data

US 2011/0232439 A1  Sep. 29, 2011

Related U.S. Application Data

(60) Provisional application No. 60/880,398, filed on Jan. 16, 2007.

(51) Int. Cl.
 *B23P 19/00* (2006.01)
(52) U.S. Cl. .............. 29/723; 29/890.03; 29/890.039; 29/890.04; 29/412; 29/415; 148/421; 148/668; 148/672; 376/260
(58) Field of Classification Search .......... 29/599, 29/723, 890.03, 890.039, 890.04, 412, 415; 148/421, 668, 672; 376/260
See application file for complete search history.

(56) References Cited

U.S. PATENT DOCUMENTS

| 4,695,426 A | 9/1987 | Nylund |
| 4,717,427 A * | 1/1988 | Morel et al. ............ 148/672 |
| 5,223,055 A | 6/1993 | Charquet |
| 5,296,058 A | 3/1994 | Steinberg |
| 6,544,361 B1 | 4/2003 | Diz et al. |
| 7,630,470 B2 | 12/2009 | Barberis et al. |
| 7,927,435 B2 * | 4/2011 | Eucken ............ 148/668 |
| 2006/0215806 A1 | 9/2006 | Barberis et al. |

FOREIGN PATENT DOCUMENTS

| EP | 0 869 197 B1 | 7/2001 |
| RU | 2184795 C2 | 7/2002 |
| RU | 2239892 C2 | 11/2004 |
| WO | 2005021818 A1 | 3/2005 |
| WO | WO 2005035817 | 4/2005 |

OTHER PUBLICATIONS

Russian Office Action dated Oct. 6, 2011 for application No. 2009131060/02(043435) with Partial English Translation.
Novikov, I.I. The Theory of Heat Treatment of Metals. Moscow, Metallurgy, 1986: p. 55 (in Russian).
Dahlback, Mats; Irradiation Growth; Fuel Technology Program Dec. 9-10, 1999; Materials/Research and Development ABB Atom AB, Nuclear Fuel Division. pp. 1-9.
International Search Report ITS/SE7/00091; dated Sep. 12, 2007.

* cited by examiner

Primary Examiner — Richard Chang
(74) Attorney, Agent, or Firm — Murphy & King, P.C.

(57) ABSTRACT

A method of manufacturing an optimized sheet metal (1) of a zirconium based alloy is described, which optimized sheet metal (1) defines a sheet plane (BA). The method comprises the steps of providing a sheet metal (2) of a zirconium based. alloy, subjecting the sheet metal (2) to at least a preparing cold rolling and a final cold rolling, wherein the preparing cold rolling and the final cold rolling are both performed in a common rolling direction, and heat treating the sheet metal (1) between the preparing cold rolling and the final cold rolling so that the zirconium based alloy is partially re-crystallized. A method of manufacturing a spacer grid using an optimized sheet metal (1) according to the invention is also described.

22 Claims, 1 Drawing Sheet

SPACER GRID FOR POSITIONING OF FUEL RODS

CROSS-REFERENCE TO RELATED APPLICATIONS

This application claims priority benefit to provisional application Ser. No. 60/880,398 which was filed on Jan. 16, 2007.

TECHNICAL FIELD

The present invention relates to a method of manufacturing an optimized sheet metal of a zirconium based alloy. The invention also relates to a method of manufacturing a spacer grid for the positioning of fuel rods in a fuel assembly in a nuclear plant.

PRIOR ART

Spacer grids are normally present at a plurality of locations along bundles of fuel rods, define grids through which the rods extend and hold the rods in place.

Spacer grids may be manufactured in many different ways. One method of manufacturing a spacer grid is based on the use of a sheet metal of a zirconium based alloy. The sheet metal of the zirconium based alloy is subjected to a number of rolling stages, wherein the sheet metal is subjected to heat treatments between the rolling stages in order to accomplish a relaxation and a structure in the alloy that promotes subsequent rolling stages. However, a sheet metal of a zirconium based alloy produced in this conventional way will, due to the micro structure of the material thereby formed, have a different tendency to growth in different directions in the sheet metal, when being submitted to neutron radiation, which is the case when it is used as a spacer grid element in different types of nuclear plants. The reason thereto, is that the rolling of the sheet metal leads to a preferred orientation of the structure in the material. Under presumption that the sheet metal is generally planar, the major tendency to growth will, in practice, be in a direction which is parallel to the rolling direction, there will be a somewhat less tendency to growth in a direction in the sheet plane perpendicular to the rolling direction, and the least tendency to growth will be in the normal direction, that is in the thickness direction of the sheet metal. When the sheet metal is subjected to neutron radiation, growth will take place in the or those of these directions which is/are most suscepted to growth, while a corresponding shrinkage takes place in any of or all the other directions. This is the immediate result of the sheet metal volume being constant when subjected to neutron radiation. During neutron radiation the sheet metal will, in practice, grow predominantly in the rolling direction, somewhat less crosswise to the rolling direction, and shrink in the thickness direction.

This creates a problem as such a sheet metal in a conventional way is used to form walls of a spacer grid for the positioning of fuel rods in a nuclear power plant. More precisely, the spacer grid defines a number of grid cells through which the fuel rods run, and the walls of which are formed by said sheet metal. Thereby, the sheet metal grows in a direction crosswise to the length direction of the grid cells, while simultaneously the wall thickness decreases, which results in an increase of the cross-sectional area of the grid cells and a formation of a play between the walls thereof and the fuel rods. Under unfavourable conditions, such as during the operation of a PWR-reactor, the fuel rods will consequently, due to said play, be subjected to a severe wear against those spacer grid portions with which they thereby come into contact, through vibration: In the long run, this may result in the formation of holes in the walls of the fuel rods and in the leakage of radioactive material to the surroundings. As also the fuel rods are made of a material suscepted to growth, another play-creating effect will arise as the diameter of the fuel rods decreases when they are subjected to neutron radiation.

In the description of the prior art in EP 0869 197 B1 a method is described which partly solves this problem. The direction of the sheets which extends perpendicularly to the lengthwise direction of the grid cells are arranged in such a way that this direction coincides with the direction of the sheets that goes crosswise to the rolling direction. A substantially reduced growth is thereby obtained in this direction, but, none the less, a growth which is sufficiently large to make the problem of the formation of a play is obtained.

The problem is also remedied to a certain extent—by punching patches out of the spacer grid walls, said patches being provided to bear on the fuel rods like springs, and to continue to bear on-the latter as growth takes place. However, zirconium alloys have a somewhat low yield-strength to be fully suitable as a spring material, whereby, in practice, the patches are only able to compensate a play as large as that which possibly arises due to the decrease of the diameter of the-fuel rods. The patches are not able to compensate the total play which is formed between the spacer grid walls and the outer surfaces of the fuel rods due to diameter shrinkage and spacer grid wall growth. After a first of a plurality of radiation cycles, the spacer grid material has also relaxed, whereby the ability of the patches to compensate for the decrease of the diameter of the fuel rods, in the subsequent cycles is substantially reduced.

U.S. Pat. No. 4,918,710 describes the fabrication of a cross-bracing grid for a fuel assembly. The grid is produced in a zirconium-based alloy. Plates or sheet of the zirconium based alloy are cold-formed with the plates in the $\alpha+\beta$ Zr-state. The grid may also be treated in the $\alpha$-phase. Support bosses for fuel rods are formed by cutting and embossing the plates.

The invention according to EP 0 869 197 B1 provides an alternative solution to the problem with abrasive wear of fuel rods against spacer grid walls due to growth of the spacer grid when it is subject to neutron radiation. As a solution EP 0 869 197 B1 provides a method comprising the steps of providing" a sheet of a zirconium based alloy, subjecting the sheet to a first heat treatment comprising 13 quenching, subjecting the sheet to a subsequent heat treatment in the a-phase temperature region of the zirconium based alloy, and then punching portions of the sheet in order to make those portions protrude from the surface of the sheet and to accomplish support surfaces for the fuel rods.

A drawback with the method described in EP 0 869 197 B1 is that equipment for $\beta$ quenching is relatively expensive.

Although the prior art solutions have provided functioning spacer grids it is still desirable to provide an alternative to the spacer grids of the prior art. It is also desirable to provide a method of manufacturing spacer grids avoiding the need for $\beta$ quenching.

SUMMARY OF THE INVENTION

An object of the present invention is to provide a method of manufacturing an optimized sheet metal of a zirconium based alloy without using $\beta$ quenching, which optimized sheet metal exhibits a small growth in at least one direction when subjected to neutron irradiation.

Another object of the present invention is to provide a method of manufacturing a spacer grid for the positioning of fuel rods in a fuel assembly in a nuclear plant without using β quenching, which spacer grid exhibits a small growth perpendicularly to the fuel rods when subjected to neutron irradiation.

The objects above are fulfilled with methods according to the—independent claims.

Further advantages are achieved with the features of the dependent claims.

A basic idea of the present invention is to provide a method with which it is possible to manufacture a sheet metal having a Kearns factor close to 0.33 in at least one direction without using β quenching.

According to a first aspect of the present invention a method of manufacturing an optimized sheet metal of a zirconium based alloy is provided, which optimized sheet metal defines a sheet plane. The method comprises the step of providing a sheet metal of a zirconium based alloy. The method is characterized in that the method comprises the steps of subjecting the sheet metal to at least a preparing cold rolling and a final cold rolling, wherein the preparing cold rolling and the final cold rolling are both performed in a common rolling direction, heat treating the sheet metal between the preparing cold rolling and the final cold rolling so that the zirconium based alloy is partially re-crystallized.

With a method according to the first aspect of the invention it is possible to achieve a Kearns factor close to 0.33 perpendicular to the rolling direction in the sheet plane of the optimized sheet metal without using p quenching. Thus, when building a plant for manufacturing spacer grids for fuel rods in a fuel assembly in a nuclear reactor it is possible to avoid investments in ovens suitable for β quenching.

The method may also comprise at least one cold rolling prior to the preparing cold rolling. Such additional cold rollings may be included in the method without affecting the end result with the sheet metal having a Kearns factor close to 0.33 perpendicular to the rolling direction in the sheet' plane of the optimized sheet metal.

The rolling direction in said at least one cold rolling prior to the preparing cold rolling is preferably esentially the same as the rolling direction in the preparing cold rolling and the final cold rolling. In this way the end result is optimized.

In order to achieve a Kearns factor close to 0.33 the degree of re-crystallisation in the heat treatment should 20 percent 90 percent.

In order to achieve a Kearns factor as close as possible to 0.33 the degree of re-crystallisation in the heat treatment is preferably 40-60 percent.

The reduction in thickness during the final cold rolling may be 40-60 percent of the thickness of the sheet metal perpendicular to the sheet plane prior to the final cold rolling. With this amount of cold rolling a Kearns factor close to 0.33 may be achieved.

The reduction in thickness during the preparing cold rolling may be 40-60 percent of the thickness of the sheet metal perpendicular to the sheet plane prior to the preparing cold rolling. During the preparing cold rolling the crystal structure of the zirconium alloy is at least partly destroyed. By a 40-60 percent reduction an optimum result is achieved.

During the heat treatment following the preparing cold rolling the zirconium alloy is partly re-crystallized. The degree of re-crystallisation depends on the temperature, during the heat treatment and the duration of the heat treatment. The heat treatment may be performed in a continuous oven or in a batch oven. In a continuous oven the sheet metal is slowly transferred through the oven while in a batch oven the sheet metal is put at rest.

If the heat treatment is performed in a continuous oven the heat treatment is performed at a temperature of 580° C.-650°, preferably at a temperature of 580° C.-630° C. and most preferred at a temperature of 580° C.-600° C.

The temperatures mentioned above are adapted for a continuous oven in which the time of the heat treatment is limited. At the temperatures mentioned above the heat treatment is preferably performed during 4-10 minutes:

When the heat treatment is performed in a batch oven the duration of the heat treatment may be chosen freely. In a batch oven the heat treatment may be performed at a temperature of 520° C.-560° C. during 1-6 hours.

The zirconium based alloy preferably comprises at least 96 percent by weight zirconium. It is also possible to use zirconium alloys with a higher zirconium content in a method according to the invention, but the best results are achieved with a ziconium content of at least 96 percent.

The zirconium based alloy may comprise any one of a number of different alloying materials.

A first example of an alloying material being contemplated for the zirconium based alloy in a spacer grid is niobium. In a spacer grid the zirconium based alloy may comprise 0.8-1.2 percent by weight niobium, preferably 1.0-1.1 percent by weight niobium and most preferred 1.02-1.04 percent by weight niobium.

A second example of an alloying material being contemplated for the zirconium based alloy in a spacer grid is tin. In a spacer grid the zirconium based alloy may comprise 0.6-1.2 percent by weight tin and preferably 0.6-0.8 percent by weight tin.

A third example of an alloying material being contemplated for the zirconium based alloy in a spacer grid is iron. In a spacer grid the zirconium based alloy may comprise 0.1-0.3 percent by weight iron.

A zirconium based alloy used in a method according to the invention may comprise any combination of the alloying materials mentioned above.

In a preferred embodiment the zirconium based alloy comprises only tin, iron and niobium. Any additional alloying materials are present in a concentration below 0.05 percent by weight.

According to a second aspect of the present invention a method is provided for manufacturing of a spacer grid for the positioning of fuel rods in a fuel assembly in a nuclear plant, which spacer grid defines grid cells for the fuel rods. The method is characterised in that the method comprises the steps of providing an optimized sheet metal according to any one of the preceding claims, cutting the optimized sheet metal into metal strips with their length axis perpendicular to the rolling direction, and arranging the strips to form the spacer grid so that the length axis of the strips extend perpendicularly to the lengthwise direction of the grid cells.

In the following preferred embodiments of the invention will be described with reference to the appended drawings.

SHORT DESCRIPTION OF THE DRAWINGS

DESCRIPTION OF PREFERRED EMBODIMENTS

Figure 1A:
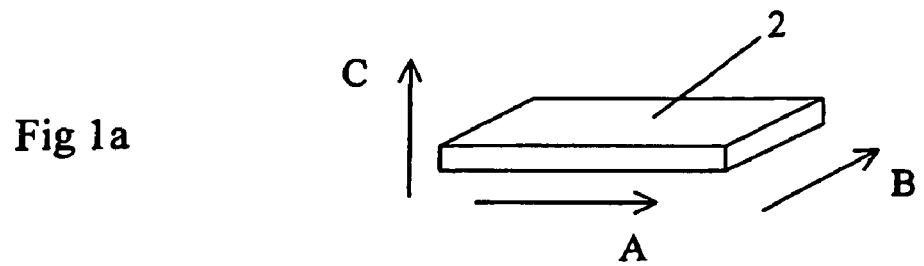
FIG. 1a shows a sheet metal which is used in a method according to an embodiment of the invention to manufacture an optimized sheet metal.

In the following description of preferred embodiments of the invention similar features will be denoted with the same reference numeral in the different figures.

Figure 1B:
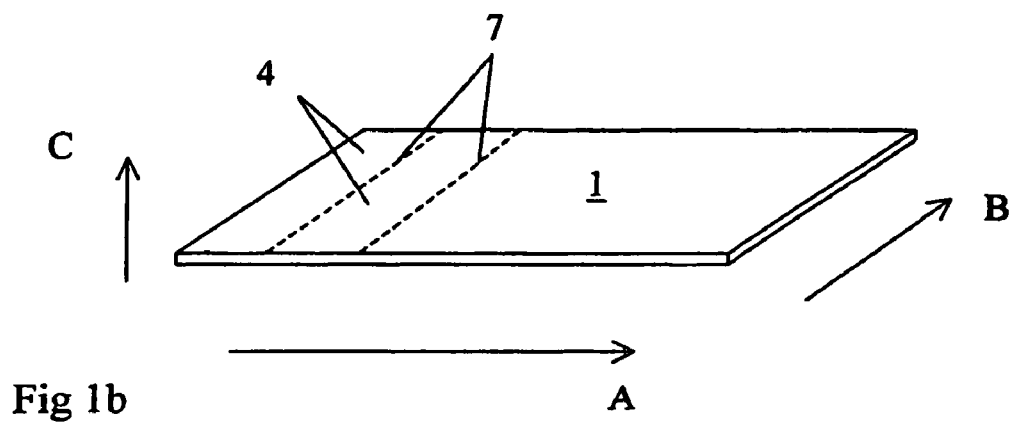
FIG. 1b shows an optimized sheet metal which has been manufactured using a method according to an embodiment of the present invention.

FIG. 1a shows a sheet metal 2 which is used in a method according to an embodiment of the invention to manufacture an optimized sheet metal 1. FIG. 1b shows an optimized sheet metal 1 which has been manufactured using a method according to an embodiment of the present invention. The sheet metal 2 as well as the optimized sheet metal 1 has a length axis A and a breadth axis B which together define a sheet plane BA. The sheet metal and the optimized sheet metal 1 has a thickness along a thickness axis C perpendicular to the sheet plane BA.

The optimized sheet metal 1 is manufactured starting from an electrode of a zirconium alloy, which comprises approximately 0.8-1.2 percent by weight of niobium, 0.1-0.3 percent by weight of iron and 0.6-0.8 percent by weight of tin based on the weight of the electrode, and which has been manufactured by pressing together zirconium briquettes together with alloying materials. The electrode is vacuum melted to a casting which thereafter is vacuum melted at least once, whereupon the casting is forged to a material which is 100-125 mm thick, which in turn is worked and surface conditioned. Then, the material is subjected to β-quenching. The material is then hot-rolled in several steps to form the sheet metal 2. The number of steps and the thicknesses after each hot-rolling depends on the final thickness that is desired on the sheet metal 2.

The material may be manufactured by other methods different from the one described above.

The sheet metal 2 that has been prepared according to the above description is then subject to at least a preparing cold rolling. The rolling direction during the preparing cold rolling is along the length axis A. The sheet metal 2 is reduced in thickness along the thickness axis C. The reduction in thickness during the preparing cold rolling is 40-60 percent of the thickness of the sheet metal along the C axis prior to the preparing cold rolling. After the preparing cold rolling the sheet metal 2 is subjected to a heat treatment so that the zirconium based alloy is partially recrystallized. The heat treatment is performed in a continuous oven during 4-10 minutes at a temperature of 580-650° C., preferably at a temperature of 580-630° C. and most preferred at a temperature of 580-600° C. The degree of re-crystallisation during the heat treatment is 20-90 percent and preferably 40-60 percent. After the heat treatment the sheet metal 2 is subjected to a final cold rolling to a finished dimension. The rolling direction during the final cold rolling is along the length axis A. The reduction in thickness during the final cold rolling is 40-60 percent of the thickness of the sheet metal 2 along the C axis prior to the final cold rolling. An optimized sheet metal 1 has thereby been manufactured. The optimized sheet metal 1 prepared according to the described method has a Kearns factor close to 0.33 along the breadth axis B.

It is possible to include additional cold rollings before the preparing cold rolling. Such additional cold rollings are followed by heat treatments to re-crystallize the zirconium alloy in the sheet metal 2 before the next additional cold rolling or the preparing cold rolling.

According to an alternative embodiment of the method the heat treatment between the preparing cold rolling and the final cold rolling is performed in a batch oven during 1-6 hours at a temperature of 520-590° C.

Figure 2:
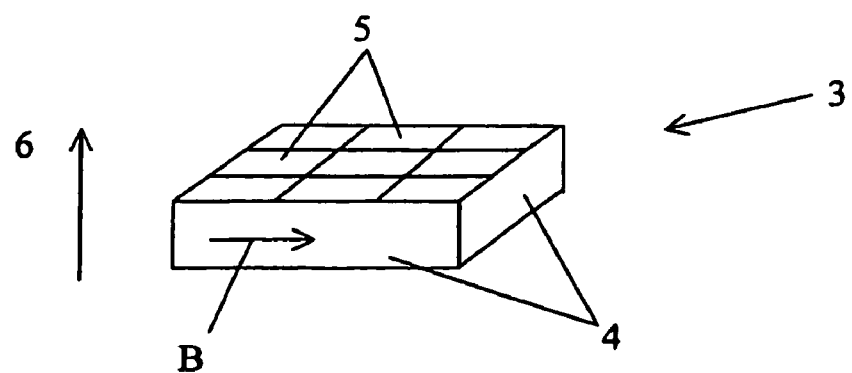
FIG. 2 shows a spacer grid according to an embodiment of the present invention.

FIG. 2 shows a spacer grid 3 according to an embodiment of the present invention. The spacer grid 3 comprises a number of metal strips 4 which forms grid cells 5 for fuel rods. The grid cells 5 define a lengthwise direction 6. The metal strips 4 have been formed from the optimized sheet metal 1 by cutting the optimized sheet metal 1 along the lines 7 as is shown in FIG. 1b so that the length axis B of the metal strips 4 coincide with the breadth axis B of the optimized sheet metal 1 and thus is perpendicular to the length axis A of the optimized sheet metal 1. The metal strips 4 are arranged in the spacer grid 3 so that the length axis of the metal strips 4 is perpendicular to the lengthwise direction 6 of the grid cells 5. The Kearns factor of the spacer grid 3 along the length axis of the metal strips and perpendicular to the lengthwise direction 6 of the grid cells 5 is close to 0.33.

When a spacer grid 3 according to the invention is used in a nuclear reactor the spacer grid 3 will be subjected to neutron irradiation and will grow due to the neutron irradiation. The spacer grid will, however, remain constant in size perpendicular to the lengthwise direction of the grid cells 5 due to the Kearns factor of the spacer grid being close to 0.33 in this direction.

The described embodiments may be amended in many ways without departing from the spirit and scope of the present invention—which is only limited by the .claims.

It is, for example not necessary that the Zirconium alloy includes all-of the alloying materials mentioned above.

It is sufficient for the zirconium alloy to include one of the alloying material mentioned above.

For simplicity the spacer grid in FIG. 2 is shown to have only 9 grid cells. It is possible to provide the spacer grid with any desirable number of grid cells.

What is claimed is:

1. A method of manufacturing a spacer grid (3) for positioning fuel rods in a fuel assembly in a nuclear plant, which spacer grid (3) defines grid cells (5) for the fuel rods, which grid cells define a lengthwise direction (6), wherein the method comprises:

manufacturing an optimized sheet metal (1) of a zirconium based alloy, wherein the optimized sheet metal (1) defines a sheet plane (BA), wherein the manufacturing of the optimized sheet metal comprises:

providing a sheet metal (2) of a zirconium based alloy that comprises niobium, tin, and iron, subjecting the sheet metal (2) to at least a preparing cold rolling and a final cold rolling, wherein the preparing cold rolling and the final cold rolling are both performed in a common rolling direction, heat treating the sheet metal (2) between the preparing cold rolling and the final cold rolling so that the zirconium based alloy is partially re-crystallized, wherein the degree of re-crystallisation in the heat treatment is at least 20 percent and no more than 90 percent;

cutting the manufactured optimized sheet metal (1) into metal strips (4) with their length axes (B) perpendicular to the rolling direction; and arranging the metal strips (4) to form the spacer grid (3) so that the length axes (B) of the metal strips (4) extend perpendicularly to the lengthwise direction (6) of the grid cells (5).

2. The method according to claim 1, also comprising at least one cold rolling prior to the preparing cold rolling.

3. The method according to claim 2, wherein the rolling direction in said at least one cold rolling prior to the preparing cold rolling is essentially the same as the rolling direction in the preparing cold rolling and the final cold rolling.

4. The method according to claim 1, wherein the degree of re-crystallisation in the heat treatment is at least 40 percent.

5. The method according to claim 1, wherein the degree of re-crystallisation in the heat treatment is no more than 60 percent.

6. The method according to claim 1, wherein the reduction in thickness during the final cold rolling is 40-60 percent of the thickness of the sheet metal (2) perpendicular to the sheet plane (BA) prior to the final cold rolling.

7. The method according to claim 1, wherein the reduction in thickness during the preparing cold rolling is 40-60 percent of the thickness of the sheet metal (2) perpendicular to the sheet plane (BA) prior to the preparing cold rolling.

8. The method according to claim 1, wherein the heat treatment is performed in a continuous oven.

9. The method according to claim 8, wherein the heat treatment is performed at a temperature of 580° C.-650°.

10. The method according to claim 8, wherein the heat treatment is performed at a temperature of 580° C.-630° C.

11. The method according to claim 8, wherein the heat treatment is performed at a temperature of 580° C.-600° C.

12. The method according to claim 8, wherein the heat treatment is performed during 4-10 minutes.

13. The method according to claim 1, wherein the heat treatment is performed in a batch oven.

14. The method according to claim 13, wherein the heat treatment is performed at a temperature of 520° C.-590° C.

15. The method according to claim 13, wherein the heat treatment is performed during 1-6 hours.

16. The method according to claim 1, wherein the zirconium based alloy comprises at least 96 percent by weight zirconium.

17. The method according to claim 1, wherein the zirconium based alloy comprises 0.8-1.2 percent by weight niobium.

18. The method according to claim 17, wherein the zirconium based alloy comprises 1.0-1.1 percent by weight niobium.

19. The method according to claim 18, wherein the zirconium based alloy comprises 1.02-1.04 percent by weight niobium.

20. The method according to claim 1, wherein the zirconium based alloy comprises 0.6-1.2 percent by weight tin.

21. The method according to claim 20, wherein the zirconium based alloy comprises 0.6-0.8 percent by weight tin.

22. The method according to claim 1, wherein the zirconium based alloy comprises 0.1-0.3 percent by weight iron.

* * * * *